United States Patent
Shintani et al.

(10) Patent No.: US 10,649,495 B2
(45) Date of Patent: May 12, 2020

(54) INFORMATION PROCESSING DEVICE

(71) Applicant: KYOCERA Document Solutions Inc., Osaka (JP)

(72) Inventors: Kazushi Shintani, Osaka (JP); Atsushi Yamada, Osaka (JP)

(73) Assignee: KYOCERA Document Solutions Inc., Tamatsukuri, Chuo-ku, Osaka (JP)

( * ) Notice: Subject to any disclaimer, the term of this patent is extended or adjusted under 35 U.S.C. 154(b) by 0 days.

(21) Appl. No.: 16/163,843

(22) Filed: Oct. 18, 2018

(65) Prior Publication Data

US 2019/0179370 A1    Jun. 13, 2019

(30) Foreign Application Priority Data

Dec. 13, 2017    (JP) .................................. 2017-238958

(51) Int. Cl.
   G09G 5/00    (2006.01)
   G06F 1/16    (2006.01)

(52) U.S. Cl.
   CPC ............ *G06F 1/1647* (2013.01); *G06F 1/163* (2013.01); *G06F 2200/1637* (2013.01)

(58) Field of Classification Search
   None
   See application file for complete search history.

(56) References Cited

U.S. PATENT DOCUMENTS

| 10,386,890 | B2 * | 8/2019 | Myung | ................. G06F 3/1454 |
| 2014/0198038 | A1 * | 7/2014 | Yagihashi | ......... H04M 1/72563 345/156 |
| 2014/0347330 | A1 * | 11/2014 | Kim | ..................... H04M 1/236 345/184 |

FOREIGN PATENT DOCUMENTS

JP    2009-031737 A    2/2009

* cited by examiner

*Primary Examiner* — Carl Adams
(74) *Attorney, Agent, or Firm* — IP Business Solutions, LLC

(57) ABSTRACT

An information processing device includes a display unit, a movement detection unit, and a control section. The display unit has two display screens of a first screen and a second screen, the second screen being an opposite side of the first screen. The movement detection unit detects a first movement state of the information processing device moving in a direction that the first screen faces and a second movement state of the information processing device moving in a direction that the second screen faces. When the movement detection unit detects the first movement state, the control section allows the first screen to display first content and allows the second screen to display second content. When the movement detection unit detects the second movement state, the control section allows the second display screen to display the first content and allows the first screen to display the second content.

6 Claims, 4 Drawing Sheets

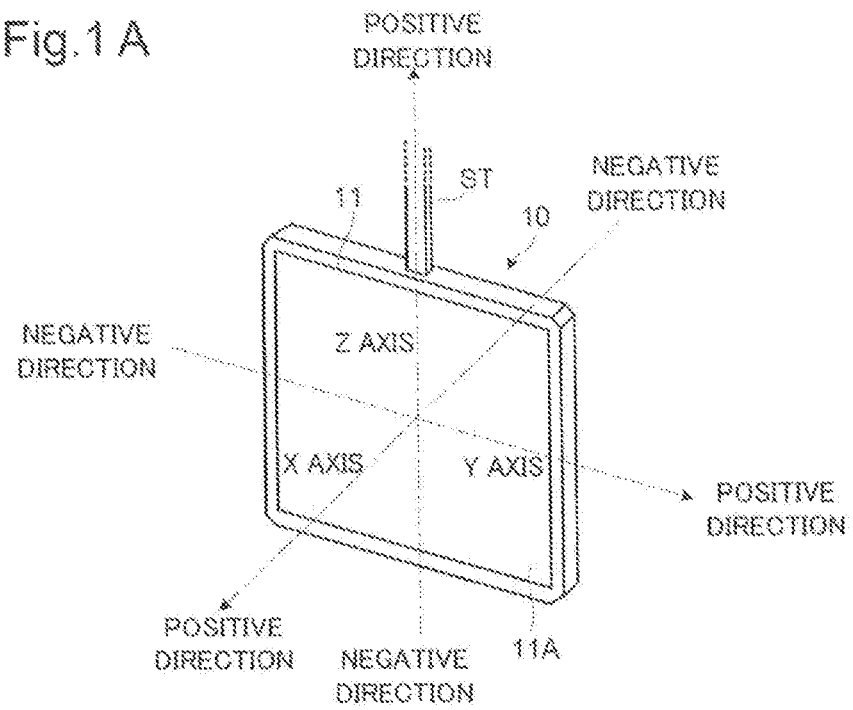
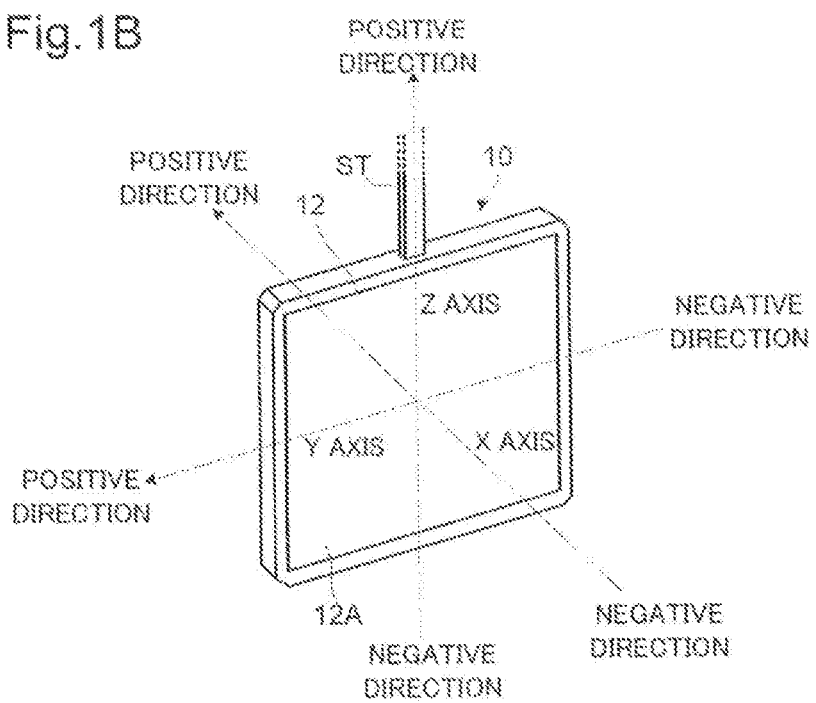

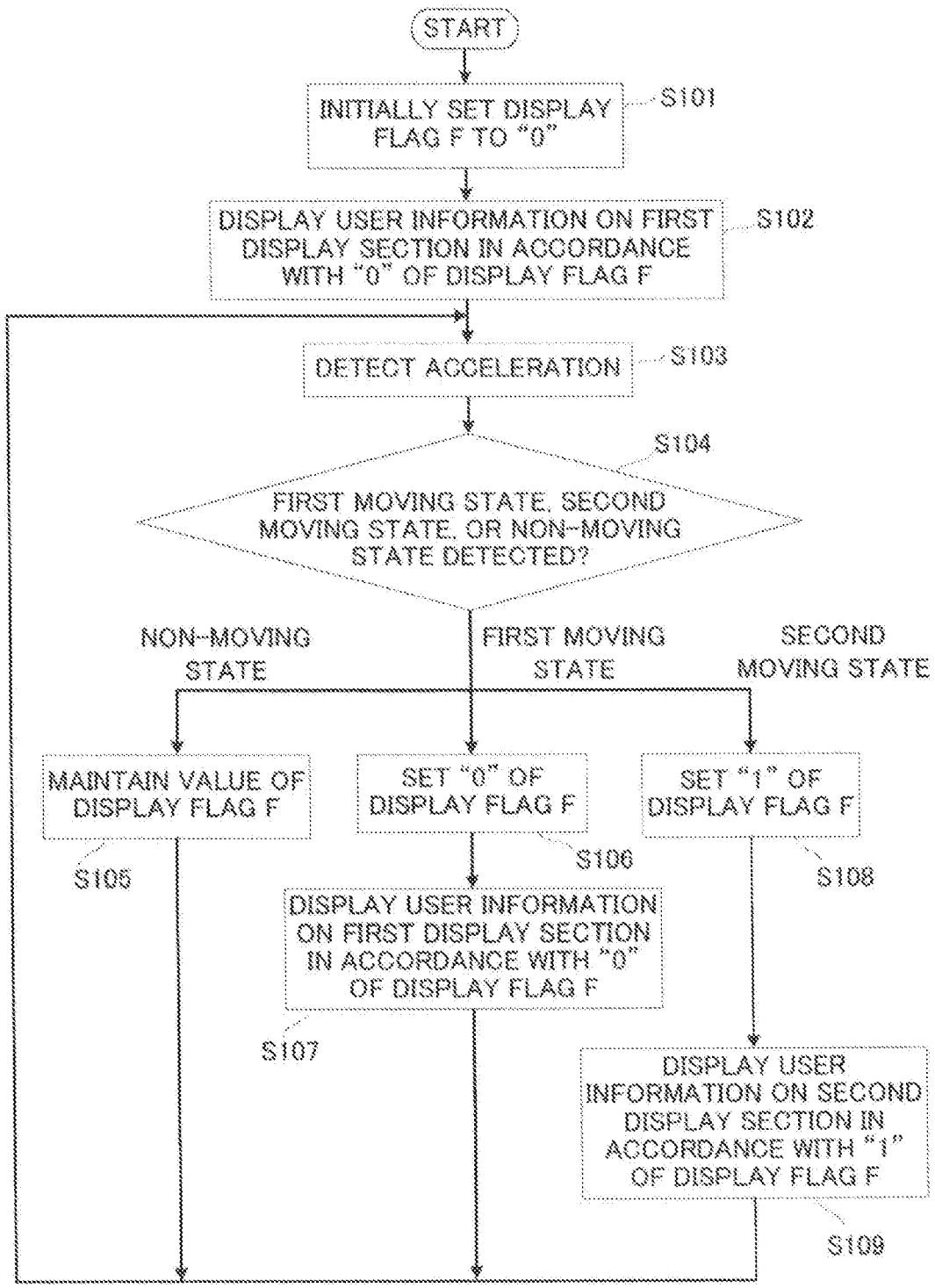

INFORMATION PROCESSING DEVICE

INCORPORATION BY REFERENCE

This application claims priority to Japanese Patent Application No. 2017-238958 filed on Dec. 13, 2017, the entire contents of which are incorporated by reference herein.

BACKGROUND

The present disclosure relates to a portable information processing device that includes a display unit having two display screens of a first screen and a second screen, the second screen being an opposite side of the first screen. The present disclosure particularly relates to a technique of switching display of each of the screens.

There are general display devices that, for example, include display screens disposed at front sides and back sides of the display devices. In such a display device, a control device and an acceleration sensor are provided at a frame of a display panel, and the control device determines of the front side of the display device on the basis of an inclination angle of the display device detected by the acceleration sensor. The control device allows the display panel to display, on the display screen at the front side, an image based on display data and allows the display panel to display, on the display screen at the back side, an image based on inverted display data in which the display data is inverted left and right and black and white.

SUMMARY

A technique improved over the aforementioned technique is proposed as one aspect of the present disclosure.

An information processing device according to one aspect of the present disclosure includes a display unit, a movement detection, and a control section. The display unit has two display screens of a first screen and a second screen, the second screen being an opposite side of the first screen. The movement detection unit detects a first movement state of the information processing device moving in a direction that the first screen faces and a second movement state of the information processing device moving in a direction that the second screen faces. When the movement detection unit detects the first movement state, the control section allows the first screen to display first content and allows the second screen to display second content. When the movement detection unit detects the second movement state, the control section allows the second display screen to display the first content and allows the first screen to display the second content.

BRIEF DESCRIPTION OF THE DRAWINGS

FIG. 1A is a perspective view from a front side showing the outer appearance of an information processing device according to one embodiment of the present disclosure.

FIG. 1B is a perspective view from a back side showing the outer appearance of the information processing device.

FIG. 4 is a flowchart showing a processing procedure for switching between the first display section and the second display section on which user information is displayed in accordance with a first movement state and a second movement state of the information processing device.

DETAILED DESCRIPTION

Hereinafter, a description will be given on one embodiment of the present disclosure with reference to the drawings.

Figure 2:
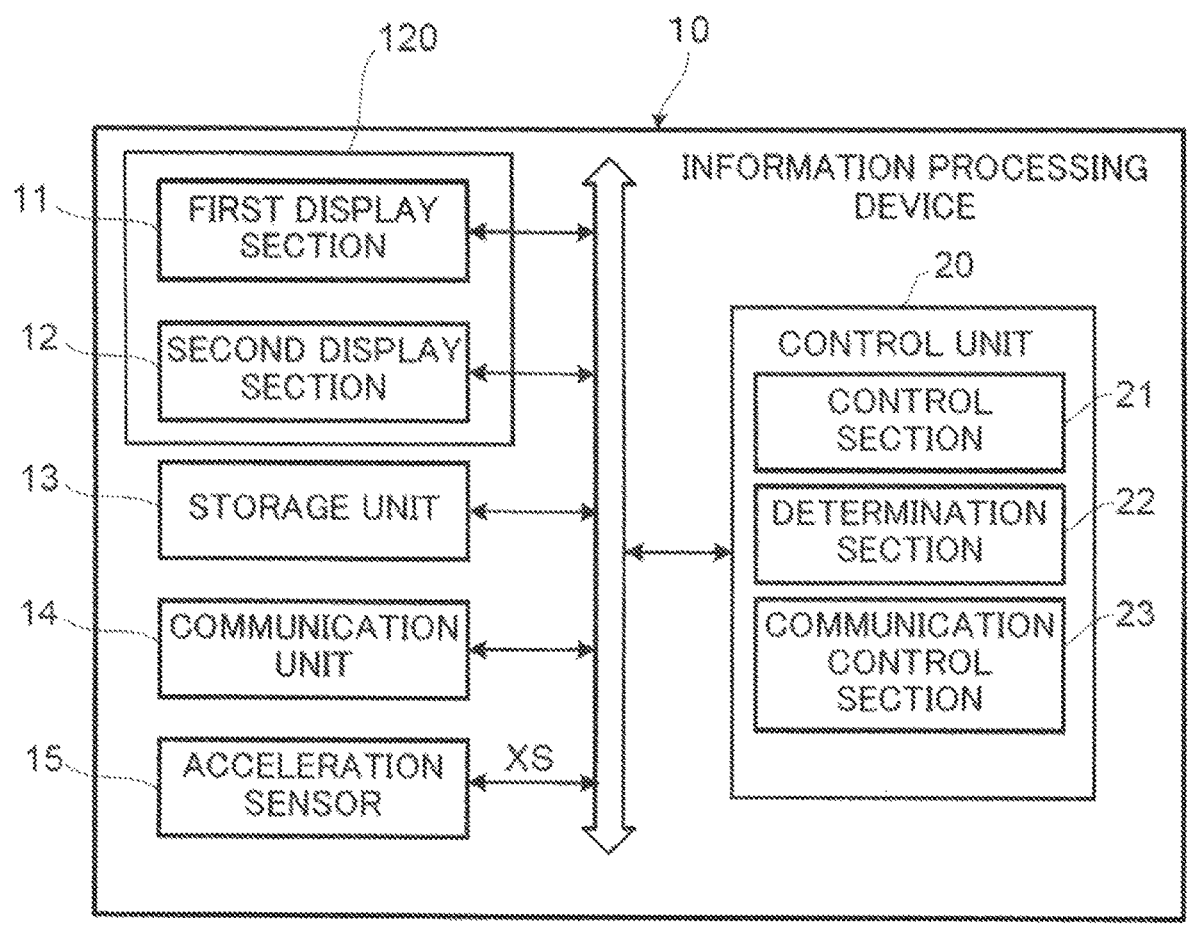
FIG. 2 is a block diagram showing an internal configuration of the information processing device according to the one embodiment.

FIG. 1A is a perspective view showing the outer appearance of an information processing device 10 according to one embodiment of the present disclosure when viewed from a front side. FIG. 1B is a perspective view showing the outer appearance of the information processing device 10 when viewed from a back side. FIG. 2 is a block diagram showing an internal configuration of the information processing device 10 according to the embodiment.

The information processing device 10 according to the embodiment is to be used as a substitution for an ID card such as an employee certificate card. The information processing device 10 includes a first display section 11, a second display section 12, a storage unit 13, a communication unit 14, an acceleration sensor 15, and a control unit 20. Each of these components can mutually transmit and receive data and signals through a bus.

The first display section 11 and the second display section 12 are each formed of a liquid crystal display (LCD), an organic light-emitting diode (OLED) display, electronic paper, or the like. The first display section 11 is disposed at a front side of, and the second display section 12 is disposed at a back side, of a casing body of the information processing device 10, and a screen 11A of the first display section 11 and a screen 12A of the second display section 12 are directed to the opposite side to each other. In other words, when viewing the first display section 11 and the second display section 12 as a display unit 120, the display unit 120 has two display screens: a first screen (the first display section 11); and a second screen (the second display section 12) arranged so as to be the opposite side of the first screen. Here, in place of the first display section 11 and the second display section 12, a single display unit having each screen directed to the opposite side to each other may be used. The display unit 120 corresponds to a display unit in What is claimed is.

The storage unit 13 is a non-volatile rewritable memory with large-capacity (for example EEPROM) and stores a control program and plurality of content that are to be displayed on the first display section 11 and the second display section 12.

The communication unit 14 is a communication interface and performs data communication among external transmitters (beacons), servers, and the like.

The acceleration sensor 15 is a known, three-axis acceleration sensor and has the function of detecting accelerations in a direction of an X axis and outputting a detection signal XS indicating the acceleration in that direction. The acceleration sensor 15 is built in the information processing device 10 so that the acceleration sensor 15 is capable of detecting the acceleration in the three directions acting on the information processing device 10.

The control unit 20 is formed of a processor, a random access memory (RAM), a read only memory (ROM), and so on. The processor is, for example, a central processing unit (CPU), an MPU, or an ASIC. When a control program stored in the above ROM or the storage section 13 is executed by the above processor, the control unit 20 functions as a control section 21, a determination section 22, and a communication control section 23. Alternatively, each component of the control unit 20 may not be implemented by the operation of the control unit 20 in accordance with the above control program but may be constituted by a hardware circuit.

The control section 21 governs the overall operation control but mainly performs display control of the first display section 11 and the second display section 12. The communication control section 23 has a function of controlling communication operation of the communication unit 14.

The determination section 22 receives the detection signal XS from the acceleration sensor 15 and determines, based on the detection signal XS, displacement of the information processing device 10.

For example, as shown in FIGS. 1A and 1B, the direction that the screen 11A of the first display section 11 faces and the direction that the screen 12A of the second display section 12 faces coincide with the direction of the X axis. Furthermore, the direction that the screen 11A of the first display section 11 faces is the positive direction of the X axis and the direction that the screen 12A of the second display section 12 faces is the negative direction of the X axis.

When the information processing device 10 starts to move in the positive direction of the X axis that the screen 11A of the first display section 11 faces, the acceleration sensor 15 outputs a positive (+) detection signal XS as the acceleration of the movement in the positive direction: when the information processing device 10 starts to move in the negative direction of the X axis that the screen 12A of the second display section 12 faces, the acceleration sensor 15 outputs a negative (−) detection signal XS as the acceleration of the movement in the negative direction. In other words, on the information processing device 10, the acceleration sensor 15 is disposed at a direction and a position so as to output the + (positive) detection signal XS and the − (negative) detection signal XS.

The determination section 22 determines, based on the detection signal XS from the acceleration sensor 15, a first movement state of the information processing device 10 moving in the positive direction of the X axis that the screen 11A of the first display section 11 faces and a second movement state of the information processing device 10 moving in the negative direction of the X axis that the screen 12A of the first display section 12 faces.

Figure 3A:
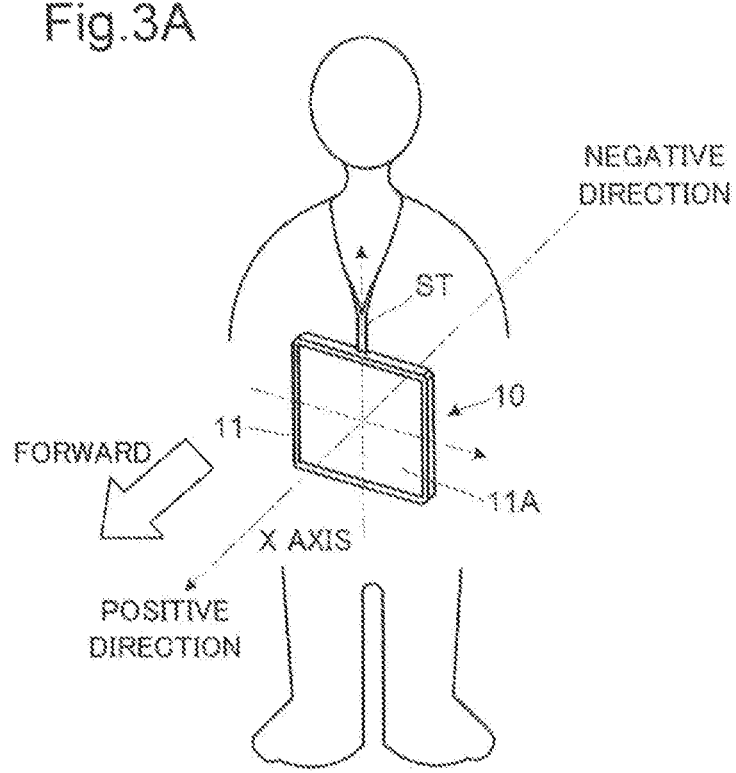
FIG. 3A is a diagram showing a state where a user walks with the information processing device in which a screen of a first display section is facing forward.

For example, as shown in FIG. 3A, when a user starts walking with the screen 11A of the first display section 11 of the information processing device 10 facing forward, the information processing device 10 is accelerated in the positive direction of the X axis that the screen 11A of the first display section 11 faces, and the + detection signal XS is outputted from the acceleration sensor 15. The determination section 22 determines whether a level of the + detection signal XS exceeds a preset positive threshold value SH1. In determining that the level of the + detection signal XS exceeds the positive threshold value SH1, the determination section 22 determines that the information processing device 10 is in the first moving state.

Figure 3B:
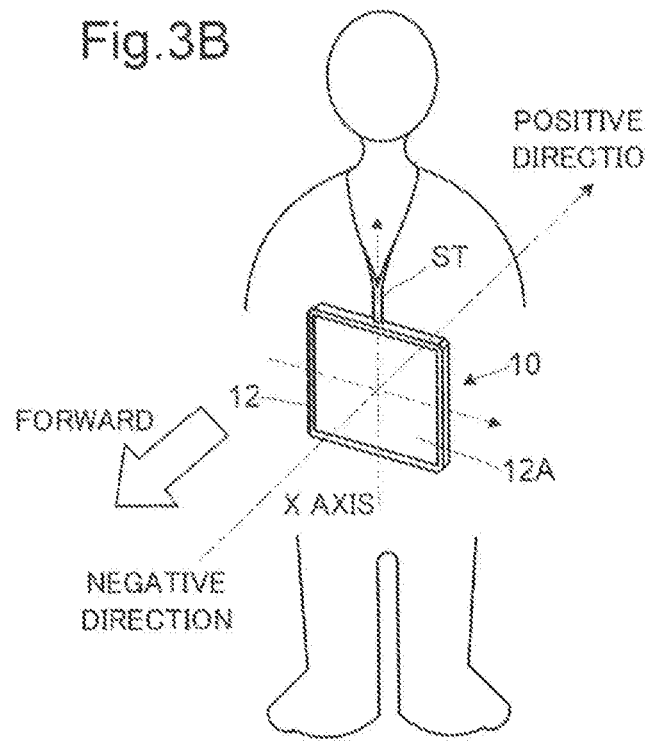
FIG. 3B is a diagram showing a state where the user walks with the information processing device in which a screen of a second display section is facing forward.

For another example, as shown in FIG. 3B, when the user starts walking with the screen 12A of the second display section 12 of the information processing device 10 facing forward, the information processing device 10 is accelerated in the negative direction of the X axis that the screen 12A of the second display section 12 faces, and the − detection signal XS is outputted from the acceleration sensor 15. The determination section 22 determines whether a level of the − detection signal XS is below a preset negative threshold value SH2. In determining that the level of the − detection signal XS is below the negative threshold value SH2, the determination section 22 determines that the information processing device 10 is in the second moving state. As described thus far, the determination section 22 identifies the first moving state shown in FIG. 3A and the second moving state shown in FIG. 3B. The acceleration sensor 15 and the determination section 22 correspond to the movement detection unit in What is claimed is.

In the information processing device 10 having the configurations described above, user information (content), such as a face photograph and an affiliation section, and other content are previously stored in the storage unit 13, and when the determination section 22 determines the first moving state, the control section 21 reads out the user information and other content from the storage unit 13 and allows the screen 11A of the first display section 11 to display the user information while allowing the screen 12A of the second display section 12 to display other content. Furthermore, when the determination section 22 determines the second moving state, the control section 21 reads out the user information and other content from the storage unit 13 and allows the screen 12A of the second display section 12 to display the user information while allowing the screen 11A of the first display section 11 to display other content.

As shown in FIG. 3A, when for example the user uses the information processing device 10 by hanging around the user's own neck with a strap ST (an example of an attachment member) and the like in place of the ID card such as the employee certificate card, under the control of the control section 21 described above, in the first moving state, the screen 11A of the first display section 11 displaying the user information is turned to face forward (i.e., the side facing the other person who is in front of the user). Furthermore, as shown in FIG. 3B, in the second moving state, the user information is displayed on the screen 12A of the second display section 12, and the screen 12A of the second display section 12 is turned to face forward. Thus, the user information is displayed to be visible to others at all times.

Furthermore, standing still and holding the information processing device 10 by hand, by turning each of the screen 11A of the first display section 11 and the screen 12A of the second display section 12 to the user's own side, the user can see each of the content displayed on the screen 11A and the screen 12A.

Next, description will be given to a processing procedure for switching between the first display section 11 and the second display section 12, on which the user information is displayed, in accordance with the first movement state and the second movement state of the information processing device 10 with reference to a flowchart shown in FIG. 4.

First, assuming that a display flag F initialized to "0" is stored in the RAM of the control unit 20 (S101). A value of the display flag F is switched to either "0" or "1": the value "0" of the display flag F corresponds to the first moving state and the value "1" of the display flag F corresponds to the second moving state.

As the value "0" of the initialized display flag F corresponds to the first moving state, the control section 21 reads out the user information and other content from the storage unit 13, allows the screen 11A of the first display section 11 to display the user information, and allows the screen 12A of the second display section 12 to display other content (S102).

Under such display state, the user hangs the strap ST of the information processing device 10 around the user's own neck so that the information processing device 10 is suspended, and the user turns the screen 11A of the first display section 11 displaying the user information to face forward: the user information becomes visible to others thereby.

Here, when the user moves, the acceleration sensor 15 outputs either the + or the − detection signal XS (S103). At this point, the determination section 22 receives the detection signal XS from the acceleration sensor 15. In determining that the detection signal XS is + and that the level of the + detection signal XS exceeds the positive threshold value SH1, the determination section 22 determines that the information processing device 10 is in the first moving state. Also, in determining that the detection signal XS is − and that the level of the − detection signal XS is below the negative threshold value SH2, the determination section 22 determines that the information processing device 10 is in the second moving state. Furthermore, if the level of the + detection signal XS does not exceed the positive threshold value SH1 and the level of the − detection signal XS is not below the negative threshold value SH2, the determination section 22 determines that the information processing device 10 is in a non-moving state in which the information processing device 10 is not moving in the direction of the X axis (S104).

For example, under a circumstance where the user dose not move or hardly moves, even if the acceleration sensor 15 detects acceleration (S103), variation in the level of the detection signal XS from the acceleration sensor 15 is small. Therefore, the level of the + detection signal XS does not exceed the positive threshold value SH1 and the level of the − detection signal XS does not become below the negative threshold value SH2. In this case, the determination section 22 determines that the information processing device 10 is in the non-moving state (NON-MOVING STATE in S104) and the value "0" of the display flag F (S105) is maintained. The process between S103 and S105 is repeatedly performed under this case and the control section 21 allows the displaying of the user information by the screen 11A of the first display section 11 and the displaying of other content by the screen 12A of the second display section 12 to be maintained.

When the user states to walk forward with the first display section 11 displaying the user information facing forward, the acceleration sensor 15 outputs the + detection signal XS (S103), the level of the + detection signal XS exceeds the positive threshold value SH1, and the determination section 22 determines that the information processing device 10 is in the first moving state (FIRST MOVING STATE in S104). When the determination section 22 determines the first moving state, the control section 21 sets the value "0" of the display flag F (S106), thereby maintaining the value "0" of the display flag F, and in accordance with the value "0" of the display flag F, the control section 21 allows the displaying of the user information by the screen 11A of the first display section 11 and the displaying of other content by the screen 12A of the second display section 12 to be maintained (S107). Then the process goes back to step S103.

If the front and back sides of the information processing device 10 is accidentally reversed while the information processing device 10 is being hanged around the user's neck with the strap ST, the user becomes in the state of walking forward with the screen 12A of the second display section 12, on which other content is displayed, is facing forward. At this time, the acceleration sensor 15 outputs the − detection signal XS (S103) as the acceleration in the negative direction of the X axis acts on the information processing device 10, and when the level of the − detection signal XS becomes below the negative threshold value SH2, the determination section 22 determines that the information processing device 10 is in the second moving state (SECOND MOVING STATE in S104). When the determination section 22 determines the second moving state, the control section 21 switches the value of the display flag F from "0" to "1" (S108), allows, in accordance with the value "1" of the display flag F, the screen 12A of the second display section 12 to display the user information and allows the screen 11A of the first display section 11 to display other content (S109). The process goes back to step S103.

When the user stops moving or hardly moves, even if the acceleration sensor 15 detects acceleration (S103), the variation in the level of the detection signal XS from the acceleration sensor 15 is small. Therefore, the level of the − detection signal XS does not become below the negative threshold value SH2 and the level of the + detection signal XS does not exceed the positive threshold value SH1. In this case, the determination section 22 determines the non-moving state (NON-MOVING STATE in S104), so that the value "0" of the display flag F is maintained (S105). When the process between S103 and S105 is repeatedly performed thereafter, the displaying of the user information by the screen 12A of the second display section 12 and the displaying of other content by the screen 11A of the first display section 11 are maintained.

If the front and back sides of the information processing device 10 is reversed again, while the information processing device 10 is being hanged around the user's neck with the strap ST, the user becomes in the state of walking forward with the screen 11A of the first display section 11, on which other content is displayed, is facing forward. At this time, the acceleration sensor 15 outputs the + detection signal XS (S103) as the acceleration in the positive direction of the X axis acts on the information processing device 10. When the level of the + detection signal XS exceeds the positive threshold value SH1, the determination section 22 determines the first moving state (FIRST MOVING STATE in S104). When the determination section 22 determines the first moving state, the control section 21 switches the value of the display flag F from "1" to "0" (S106), allows, in accordance with the value "0" of the display flag F, the screen 11A of the first display section 11 to display the user information and allows the screen 12A of the second display section 12 to display other content (S109). The process goes back to step S103.

Thereafter, if the front and back sides of the information processing device 10 are reversed and the user walks forward, acceleration acts on the information processing device 10 and the first moving state or the second moving state is determined. If the first moving state is determined, the user information is displayed on the screen 11A of the first display section 11 and other content is displayed on the screen 12A of the second display section 12: if the second moving state is determined, the user information is displayed on the screen 12A of the second display section 12 and other content is displayed on the screen 11A of the first display section 11.

As described above, the information processing device 10 according to the present embodiment determines whether the information processing device 10 is in the first moving state or the second moving state (i.e., determines which one of the screen 11A of the first display section 11 and the screen 12A of the second display section 12 is facing forward), and allows the screen of the display unit which is facing forward to display the user information. Thus, the information processing device 10 is capable of displaying the user information so as to be seen by others at all times. Furthermore, holding the information processing device 10 by hand, the user can see each of the content displayed on the screen 11A of the first display section 11 and the screen 12A of the second display section 12.

The case where the information processing device described in the above BACKGROUND is used in place of ID cards such as the employee certificate cards is conceivable. ID card is usually used by being hanged around a user's neck by a strap and the like, and because it is necessary to show user information (content) such as a face photograph and an affiliation section to the other person who is in front of the user, the user information such as a face photograph and an affiliation section is required to be displayed at all times on a display unit when using the information processing device in place of the ID card. Under a circumstance of using the information processing device as the ID card by hanging around the user's neck by the strap, however, the front and back sides of the information processing device may be accidentally reversed, so that the display surface on which the user information is displayed may become unseeable.

For this reason, when the information processing device described in the above BACKGROUND is used as the ID card, it is conceivable to display the user information on each of both sides of the display screens. It cannot be said, however, that each of both sides of the display screens are effectively used in the information processing device described in the above BACKGROUND because the same content are always displayed on both sides of the display screens.

According to the present embodiment, in contrast, when the display device having two display screens of the first screen and the second screen that is disposed on the opposite side of the first screen is used by being hanging around the user's neck by a strap in place of the ID card such as the employee certificate card, it is capable of displaying a preset content on the screen that is the side facing the other person who is in front of the user and displaying other content on the other screen that is on the opposite side.

In the present embodiment a plurality of content stored in advance is switched and displayed. The information processing device 10 may be arranged so that the communication unit 14 receives the content transmitted from an external transmitter (for example a beacon), the control section 21 allows the storage unit 13 to store the received content, and allows the screen 11A of the first display section 11 or the screen 12A of the second display section 12 to display the received content.

For example, when information (content) on a dining room and a conference room is transmitted from a transmitter installed in the dining room or the conference room to the information processing device 10, in the information processing device 10, the communication unit 14 receives the content. The control section 21 allows the storage unit 13 to store the received content, allows either the screen 11A of the first display section 11 or the screen 12A of the second display section 12 to display the user information, and allows the other screen, on which the user information is not displayed, to display the received content.

For another example, the control section 21 may be arranged so as to receive content from an external server through the communication control section 23 and the communication unit 14, allow the storage unit 13 to store the content, read out the content from the storage unit 13 in accordance with a determination result by the determination section 22, and allow either the screen 11A of the first display section 11 or the screen 12A of the second display section 12 to display the content.

In another embodiment, the storage unit 13 may store various content in association with a swing in a direction of a Y axis (vertical direction) and its number of times and a swing in a direction of a Z axis (horizontal direction) and its number of times, the determination section 22 may determine the swing in the direction of the Y axis and its number of times and the swing in the direction of the Z axis and its number of times in the information processing device 10 based on a detection signal YS (signal representing the swing in the direction of the Y axis) and a detection signal ZS (signal representing the swing in the direction of the Z axis) outputted from the acceleration sensor 15, the control section 21 may read out the content being in association with the swing in the determined direction and its number of times from the storage unit 13, and may allow either the first display section 11 or the second display section 12 on which the user information is not displayed to display the content. In this case, holding the information processing device 10 by hand, by swinging the information processing device 10 in the direction of the Y axis or the Z axis (as a specific direction), the user can have the various content be displayed on the screen of the display unit on which the user information is not displayed, and can see the displayed content.

In the above described another embodiment, the acceleration sensor 15 capable of outputting each of the detection signal YS (signal representing the swing in the direction of the Y axis) and the detection signal ZS (signal representing the swing in the direction of the Z axis) is used.

Furthermore, the control section 21 may be arranged so as to allow the second display section 12 to display exhaustion of a battery, just before the voltage of the battery of the information processing device 10 is reduced and also before the switching and displaying of the content by the first display section 11 and the second display section 12 becomes difficult to be performed. For example, the control section 21 may compare the voltage of the battery with a preset threshold value, and when the voltage of the battery is reduced to the threshold value, allows at least one of the first display section 11 and the second display section 12 to display a message reporting exhaustion.

In addition, an IC chip similar to a general IC card may be built in the information processing device 10 or a bar code or magnetic stripe indicating identification information may be provided on the outside of the casing body of the information processing device 10.

The structure and configuration described in the above embodiment with reference to FIGS. 1A to 4 are merely illustrative and are not intended to limit the present disclosure to them.

While the present disclosure has been described in detail with reference to the embodiments thereof, it would be apparent to those skilled in the art the various changes and modifications may be made therein within the scope defined by the appended claims.

What is claimed is:
1. An information processing device comprising:
a display unit having two display screens of a first screen and a second screen, the second screen being an opposite side of the first screen;

a movement detection unit that detects a first movement state of the information processing device moving in a direction that the first screen faces and a second movement state of the information processing device moving in a direction that the second screen faces;

a storage unit that stores user information and other content; and a control section that, when the movement detection unit detects the first movement state, sets a value of a display flag to a first value, reads out the user information from the storage unit to allow the first screen to display the user information and reads out the other content from the storage unit to allow the second screen to display the other content, and that, when the movement detection unit detects the second movement state, sets the value of the display flag to a second value different from the first value, reads out the user information from the storage unit to allow the second display screen to display the user information and reads out the other content from the storage unit to allow the first screen to display the other content, wherein the movement detection unit includes: a sensor that detects an acceleration of the information processing device moving in the direction that the first screen faces, outputs a positive detection signal of a level corresponding to the acceleration detected, detects an acceleration of the information processing device moving in the direction that the second screen faces, and outputs a negative detection signal of a level corresponding to the acceleration detected; and a determination section that determines the first moving state when determining that the level of the positive detection signal from the sensor exceeds a preset positive threshold value, and determines the second moving state when determining that the level of the negative detection signal from the sensor is below a preset negative threshold value, the determination section further determines a non-moving state when determining that the level of the positive detection signal from the sensor does not exceed the preset positive threshold value or when determining that the level of the negative detection signal from the sensor is not below the preset negative threshold value, when the determination section determines the non-moving state, the control section maintains the value of the display flag and allows displaying by the first screen and the second screen to be maintained, and under any state of the first moving state and the second moving state, the control section allows, out of the first screen and the second screen of the display unit, a screen which is facing forward to display the user information.

2. The information processing device according to claim 1, wherein
the control section maintains a state of allowing the first screen to display the user information and allowing the second screen to display the other content until the movement detection unit detects the second movement state from when the movement detection unit has detected the first movement state, and the control section maintains a state of allowing the second screen to display the user information and allowing the first screen to display the other content until the movement detection unit detects the first movement state from when the movement detection unit has detected the second movement state.

3. The information processing device according to claim 1 further comprising:
a communication unit that receives content transmitted from an external terminal device,
wherein
the storage unit stores the content received by the communication unit as receiving content, and
the control section reads out the receiving content from the storage unit and allows the first display or the second display to display the receiving content.

4. The information processing device according to claim 1, wherein
the storage unit further stores different content in association with a swing in a specific direction, the specific direction being a direction orthogonal to the direction that the first screen faces and the direction that the second screen faces,
the sensor further detects a swing in the specific direction of the information processing device,
the determination section further determines, based on a detection signal from the sensor, the swing in the specific direction of the information processing device, and
the control section reads out the different content that corresponds to the swing in the specific direction of the information processing device, the swing having been determined by the determination section, and the control section allows either the first screen or the second screen on which the user information is not displayed to display the different content.

5. The information processing device according to claim 1, wherein
the information processing device is a portable card-type, and
the information processing device further comprises an attachment member used to detachably attach the information processing device to a user's body.

6. The information processing device according to claim 1, wherein
the storage unit further stores various content respectively in association with swinging directions swung in directions orthogonal to the direction that the first screen faces and the direction that the second screen faces and respective number of times of swings in the swinging directions,
the sensor further detects swinging direction and its number of times of the information processing device,
the determination section further determines, based on a detection signal from the sensor, the swinging direction and its number of times of the information processing device, and
the control section reads out, among the various content, one content that corresponds to the swinging direction and its number of times of the information processing device having been determined by the determination section, and the control section allows either the first screen or the second screen on which the user information is not displayed to display the one content among the various content.

* * * * *